(12) United States Patent
Maltsev et al.

(10) Patent No.: US 8,243,677 B2
(45) Date of Patent: Aug. 14, 2012

(54) SCHEDULER AND METHOD FOR ALLOCATING TIME AND FREQUENCY DIMENSIONS OF DOWNLINK BURSTS IN BROADBAND WIRELESS ACCESS NETWORKS

(75) Inventors: Alexander Alexandrovich Maltsev, Nizhny Novgorod (RU); Alexander Alexandrovich Maltsev, Jr., Nizhny Novgorod (RU); Vadim Sergeyevich Sergeyev, Novgorod (RU)

(73) Assignee: Intel Corporation, Santa Clara, CA (US)

( * ) Notice: Subject to any disclaimer, the term of this patent is extended or adjusted under 35 U.S.C. 154(b) by 926 days.

(21) Appl. No.: 12/162,883

(22) PCT Filed: Mar. 13, 2006

(86) PCT No.: PCT/RU2006/000112
§ 371 (c)(1),
(2), (4) Date: Jul. 31, 2008

(87) PCT Pub. No.: WO2007/105977
PCT Pub. Date: Sep. 20, 2007

(65) Prior Publication Data
US 2009/0059860 A1 Mar. 5, 2009

(51) Int. Cl.
*H04W 4/00* (2009.01)
*H04J 3/16* (2006.01)
(52) U.S. Cl. ........................................ 370/330; 370/465

(58) Field of Classification Search .......... 370/328–330, 370/336–337, 341, 343–345, 347, 431, 437, 370/442, 464–465, 478; 455/422.1, 436, 455/450–451, 455
See application file for complete search history.

(56) References Cited

U.S. PATENT DOCUMENTS

2003/0123425 A1 7/2003 Walton et al.
2007/0004419 A1* 1/2007 Ji et al. .......................... 455/447

FOREIGN PATENT DOCUMENTS

| CA | 2442901 | 3/2005 |
|---|---|---|
| CN | 1432221 | 7/2003 |
| WO | WO-0176098 A2 | 10/2001 |
| WO | WO 2005008360 A2 * | 1/2005 |
| WO | WO-2005008360 A2 | 1/2005 |
| WO | WO-2007105977 A1 | 9/2007 |

OTHER PUBLICATIONS

"Chinese Application Serial No. 200680052693.2, Office Action mailed Oct. 19, 2010", 12 pgs.
"European Application Serial No. 06799620.7, Office Action mailed Feb. 8, 2010", 3 pgs.
European Application Serial No. 06799620.7, Office Action mailed Jan. 13, 2009, 4 pgs.

* cited by examiner

*Primary Examiner* — Michael Thier
*Assistant Examiner* — Feben M Haile
(74) *Attorney, Agent, or Firm* — Schwegman, Lundberg & Woessner, P.A.; Gregory J. Gorrie

(57) ABSTRACT

Embodiments of a scheduler and a method for assigning frequency and time dimensions of downlink bursts in broadband wireless access networks are generally described herein. Other embodiments may be described and claimed. In some embodiments, the frequency and time dimensions of downlink bursts are assigned to each of a plurality of subscriber stations based on one or more individual channel characteristics and one or more individual data requirements associated with the subscriber stations.

2 Claims, 5 Drawing Sheets

SCHEDULER AND METHOD FOR ALLOCATING TIME AND FREQUENCY DIMENSIONS OF DOWNLINK BURSTS IN BROADBAND WIRELESS ACCESS NETWORKS

This application is a U.S. National Stage Filing under 35 U.S.C. 371 from International Application No. PCT/RU2006/000112, filed Mar. 13, 2006 and published in English as WO 2007/105977 on Sep. 20, 2007, which application and publication is incorporated herein by reference in their entireties.

TECHNICAL FIELD

Some embodiments of the present invention pertain to wireless communication systems. Some embodiments pertain to broadband wireless access (BWA) networks such as networks that communicate using orthogonal frequency division multiple access (OFDMA) frames.

BACKGROUND

In broadband wireless access (BWA) networks, base stations may communicate with one or more subscriber stations by transmitting a downlink subframe which includes a preamble followed by a number of bursts. Each burst may be directed to a particular subscriber station and may be transmitted over one or several subchannels. However, channel bandwidth of some conventional BWA networks may not be used efficiently because the channel characteristics between each subscriber station and the base station may be different and may vary over time and/or frequency.

Thus, there are general needs for BWA networks and methods that make more efficient use of channel bandwidth for improved throughput.

DETAILED DESCRIPTION

Figure 1:
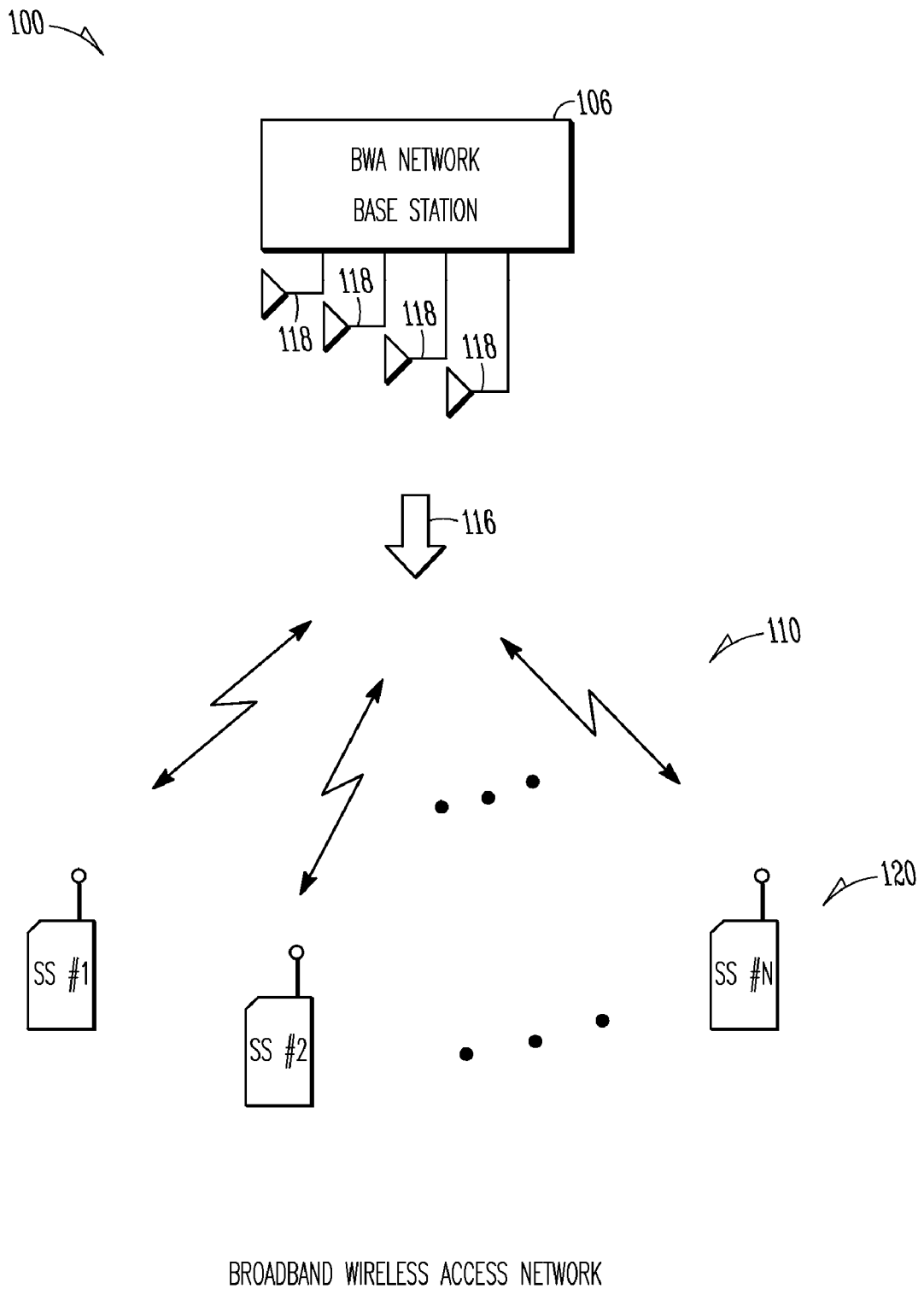
FIG. 1 illustrates a broadband wireless access network in accordance with some embodiments of the present invention.

The following description and the drawing sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

FIG. 1 illustrates a broadband wireless access (BWA) network in accordance with some embodiments of the present invention. BWA network 100 may include Base station 106 and a plurality of subscriber stations (SS) 120, generally shown as SS #1, SS #2, and SS #N. Base station 106 may use antennas 118 to communicate with subscriber stations 120 by transmitting downlink subframe 116 to one or more of subscriber stations 120 and by receiving uplink subframes (not illustrated) from one or more of subscriber stations 120. Downlink subframe 116 may include a downlink (burst for each of subscriber stations 120. Base station 106 and each of subscriber stations 120 may communicate through one of channels 110. The channel characteristics of each of channels 110 may be different and may vary over both time and frequency. In some embodiments, base station 106 may schedule downlink bursts based on the characteristics of each of these channels 110.

In accordance with some embodiments, the frequency and time dimensions of the downlink bursts may be determined based on, among other things, the individual channel characteristics of channels 110 between subscriber stations 120 and base station 106. In some embodiments, the frequency and time dimensions of the downlink bursts may further be determined based on the data requirements of subscriber stations 120. These embodiments are described in more detail below. The number of subscriber stations 120 may range from as few as one subscriber station to as many as ten or more. In some embodiments, the number of subscriber stations 120 may be as great as several hundred, although the scope of the invention is not limited in this respect.

In some embodiments, a two-step downlink burst scheduling scheme may be implemented by base station 106. In some embodiments, throughput may be improved for network 100 by considering both data rates of individual communication channels 110 and the amount of data waiting for transmission to each of subscriber stations 120. In some of these embodiments, throughput may be improved and possibly optimized and/or maximized for network 100 by considering both data rates of individual communication channels 110 and the amount of data waiting for transmission to each of subscriber stations 120. In these embodiments, two maximum values of a scheduling metric may be considered allowing base station 106 to determine a more optimum solution for downlink burst scheduling. In some embodiments, two maximum values of a scheduling metric for a subscriber station may be considered for the same subchannel, and two maximum values of the scheduling metric for a subchannel may be considered for the same subscriber station. In some embodiments, channel capacity is assigned to a subscriber station based on a maximal difference between the two maximum values. These embodiments are discussed in more detail below.

In some embodiments of this two-step approach, the first step may include determining the two maximum values of a scheduling metric for each subscriber station 120 for each subchannel, and determining two maximum values of the scheduling metric for each subchannel for each subscriber station 120. The second step may include assigning channel capacity to a subscriber station 120 based on a maximal difference between the two maximum values of the scheduling metric.

In some embodiments, base station 106 and subscriber stations 120 may transmit communication signals in accordance with a multiple access technique, such as OFDMA, using a multicarrier communication channel. The multicarrier communication channel may be within a predetermined frequency spectrum and may comprise a plurality of orthogonal subcarriers. In some embodiments, the signals may be defined by closely spaced orthogonal frequency division multiplexed (OFDM) subcarriers. Each subcarrier may have a null at substantially a center frequency of the other subcarriers and/or each subcarrier may have an integer number of cycles within a symbol period, although the scope of the invention is not limited in this respect. In some embodiments, multicarrier transmitter may communicate using spread-spectrum signals.

In some embodiments, base station 106 may be a broadband communication station, such as a Worldwide Interoperability for Microwave Access (WiMax) communication station, and subscriber stations 120 may be broadband subscriber stations, such as WiMax subscriber stations. In some BWA network embodiments, the frequency spectrum for communications may comprise frequencies between 2 and 11 gigahertz (GHz), although the scope of the invention is not limited in this respect.

In some embodiments, base station 106 and subscriber stations 120 may communicate in accordance with specific communication standards, such as the Institute of Electrical and Electronics Engineers (IEEE) standards including the IEEE 802.16-2004 and/or the IEEE 802.16(e) standards for wireless metropolitan area networks (WMANs) including variations and evolutions thereof, although the scope of the invention is not limited in this respect. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," October 2004 and related amendments/versions.

In some embodiments, any one or more of subscriber stations 120 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Antennas 118 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some embodiments, antennas 118 may be effectively separated to take advantage of spatial diversity and the different channel characteristics that may result between each of antennas 118 and subscriber stations 120. In some embodiments, antennas 118 may be separated by up to $\frac{1}{10}$ of a wavelength or more, although the scope of the invention is not limited in this respect.

Figure 2:
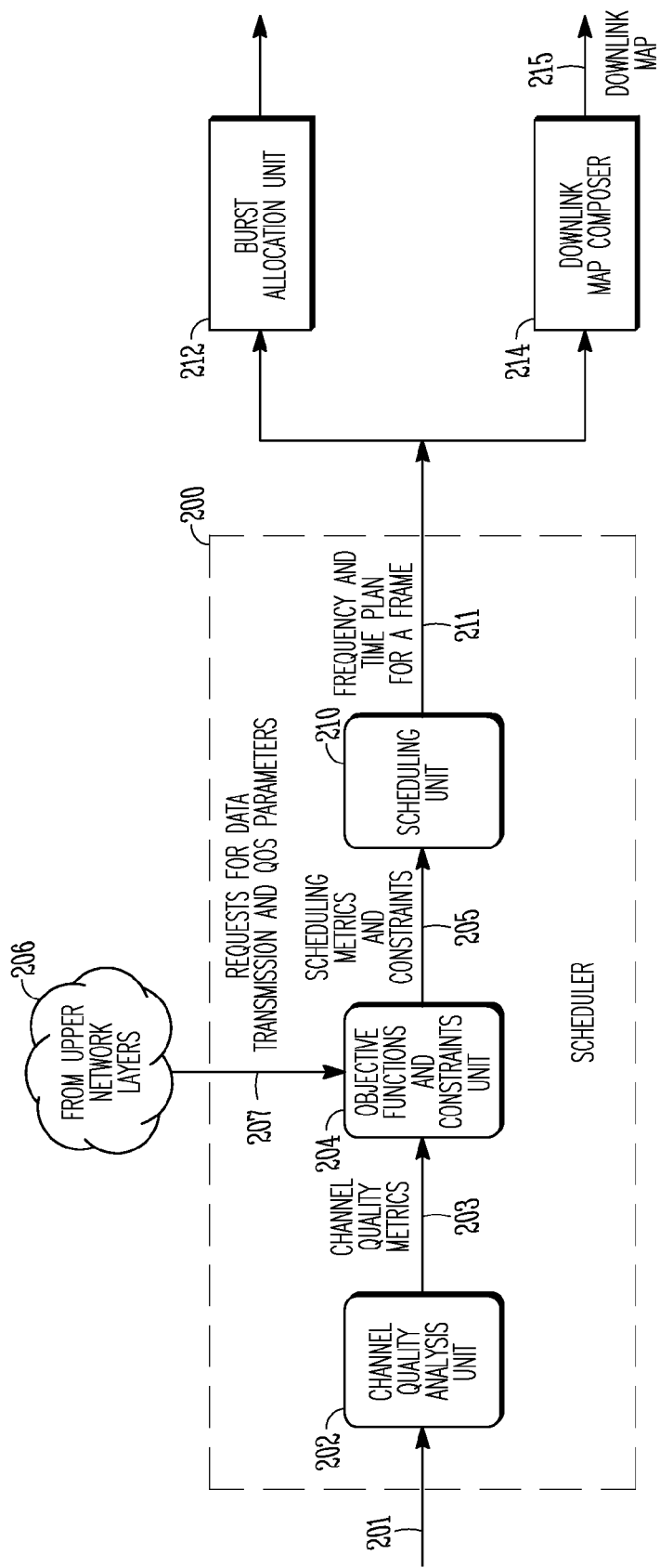
FIG. 2 is a functional block diagram of a scheduler, a burst allocation unit and a downlink map composer in accordance with some embodiments of the present invention.

FIG. 2 is a functional block diagram of a scheduler, a burst allocation unit and a downlink (map composer in accordance with some embodiments of the present invention. Scheduler 200, burst allocation unit 212, and downlink (DL) map composer 214 may be part of the media access control (MAC) layer of a BWA network base station, such as base station 106 (FIG. 1).

Figure 3A:
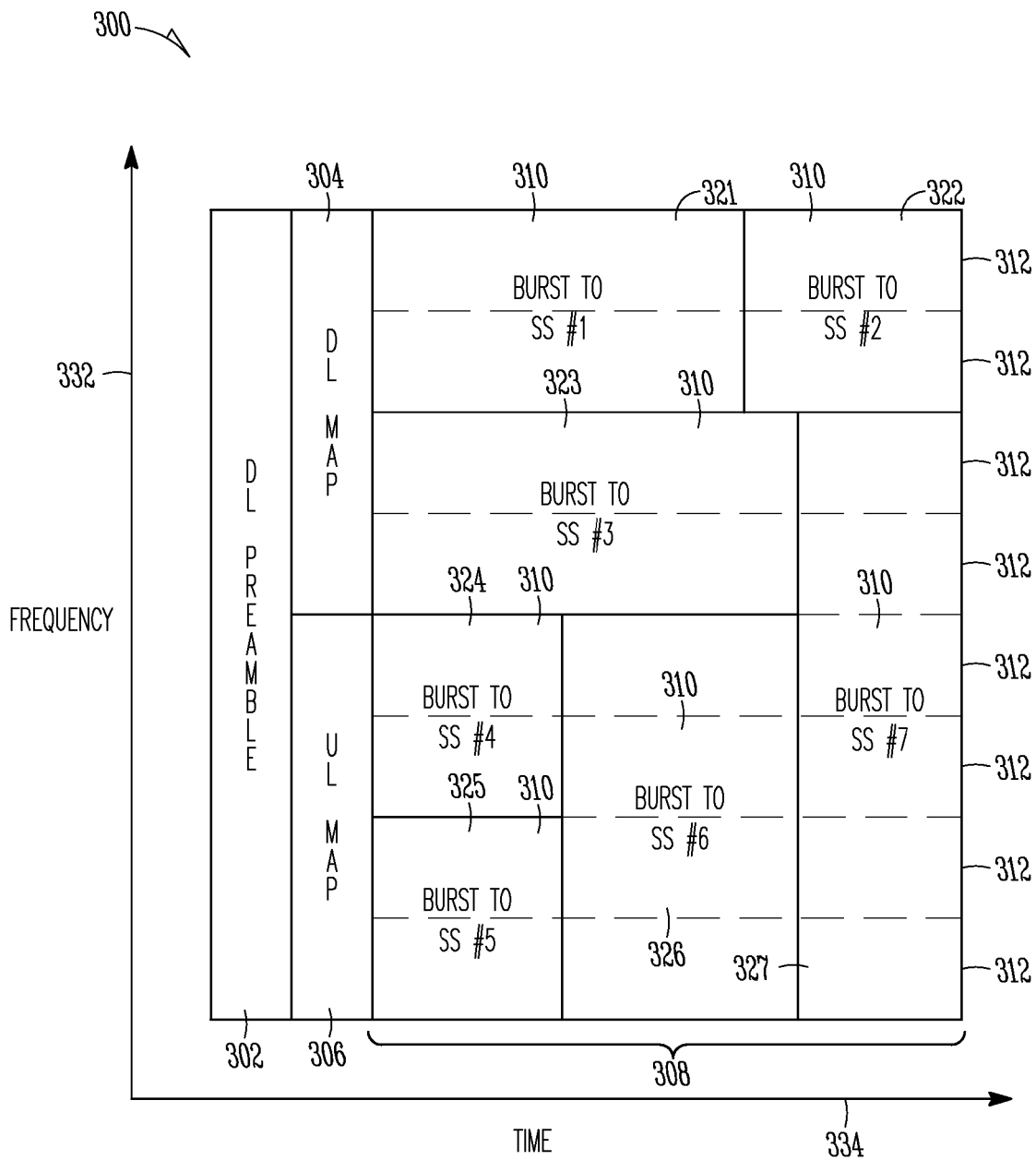
FIGS. 3A and 3B illustrate examples of OFDMA downlink subframes in accordance with some embodiments of the present invention.
Figure 3B:
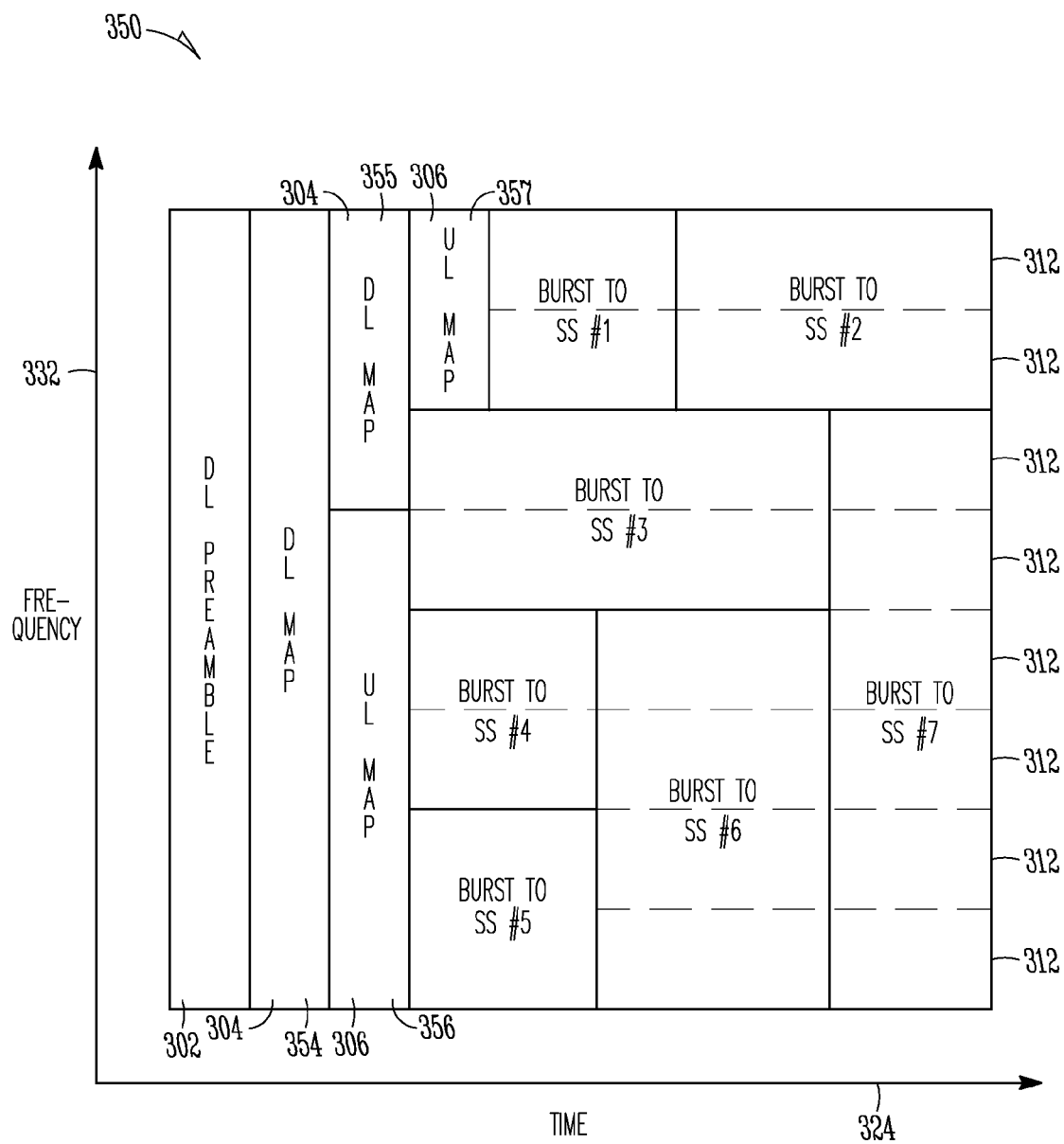

As described in detail below, scheduler 200 generates frequency and time plan 211 for a downlink (subframe based on channel characteristics 201 and subscriber station data requirements 207. In these embodiments, scheduler may be a channel-aware scheduler. Subscriber station data requirements 207 may be provided by upper network layers 206 of the base station. Burst allocation unit 212 allocates the downlink burst among subchannels and time slots based on frequency and time plan 211. Downlink map composer 214 generates downlink map 215 based on frequency and time plan 211. Downlink map 215 may indicate the subchannels and time slots of the downlink bursts for each of subscriber stations 120 (FIG. 1). Downlink map 215 may be transmitted to subscriber stations 120 (FIG. 1) as part of a downlink (subframe. The downlink subframe may include a plurality of downlink bursts for subscriber stations 120 (FIG. 1) transmitted in accordance with downlink map 215 based on instructions from burst allocation unit 212. Examples of downlink (subframes are illustrated in FIGS. 3A and 3B described below.

Scheduler 200 includes channel quality analysis unit 202, objective functions and constraints unit 204, and scheduling unit 210. Due to the frequency selectivity of the channels 110 (FIG. 1) between base station 106 (FIG. 1) and subscriber stations 120 (FIG. 1), different subchannels may have different capacity (e.g., in terms of data rate) that can be achieved, for example, at a target bit-error-rate. Because the channel characteristics may differ from subscriber station to subscriber station, the capacity of each subchannel may also be different for different subscriber stations. In some embodiments, scheduler 200 may optimize data allocation within a downlink subframe in order to achieve higher overall system throughput and/or achieve a higher value of some other objective function. Examples of these are described in more detail below.

In some embodiments, channel quality analysis unit 202 calculates channel quality metrics 203 from channel characteristics 201. In some embodiments, channel quality metrics 203 may be obtained through analysis of the signals received by base station 106 (FIG. 1) and/or through an analysis of channel feedback or performance feedback received from each of subscriber stations 120 (FIG. 1). In some embodiments, the channel estimates may be produced by both base station 106 (FIG. 1) and subscriber stations 120 (FIG. 1). In some embodiments, the channel estimates used to determine the channel capacities are generated by base station 106 (FIG. 1), although the scope of the invention is not limited in this respect. In some embodiments, channel feedback and performance feedback may be generated by subscriber stations 120 (FIG. 1). In these embodiments, the channel feedback from one of subscriber stations 120 (FIG. 1) may be based on the channel estimate produced by that subscriber station, although the scope of the invention is not limited in this respect.

Objective functions and constraints unit 204 may operate on channel quality metrics 203 and subscriber station data requirements 207 to generate scheduling metrics and constraints 205 for scheduling unit 210. In some embodiments, subscriber station data requirements 207 may include requests for data and/or quality-of-service (QOS) parameters. When calculating scheduling metrics and constraints 205, objective function and constraints unit 204 may use various quality-of-service parameters such as throughput, delay, target error level, and/or fairness to subscriber stations 120 (FIG. 1). In some embodiments, objective functions and constraints unit 204 may also use information such as history of throughput for each subscriber station 120 (FIG. 1), length of corresponding queues and the like in generating scheduling metrics and constraints 205 whereas other systems may first schedule subscribers with a maximum scheduling metric.

Scheduling unit 210 may use scheduling metrics and constraints 205 to generate frequency and time plan 211 for a downlink subframe. In some embodiments, scheduling unit 210 may perform a subframe time and frequency assignment procedure, such as the one described below in reference to FIG. 5.

Downlink map composer 214 converts frequency and time plan 211 into a form readable or usable by subscriber stations 120 (FIG. 1) to allow subscriber stations 120 (FIG. 1) to demodulate and decode their assigned downlink burst. Burst allocation unit 212 may allocate bursts addressed to different subscriber stations 120 (FIG. 1) in accordance with frequency and time plan 211. Downlink map composer 214 may express the frequency width of the assigned burst in subchannels and the time length of the burst in time slots, although the scope of the invention is not limited in this respect. Downlink map composer 214 may also indicate the modulation order (e.g., a quadrature amplitude modulation (QAM) modulation level) and coding rate that are used to encode and modulate the associated downlink burst.

In other embodiments, additional or other parameters may be specified in downlink map 215 by downlink map composer 214. For example, when base station 106 (FIG. 1) has the capability to vary the power level of each downlink burst, the relative power level of each burst may be specified. In some multi-antenna embodiments that use space-time coding (STC), parameters for decoding the signals may be specified in downlink map 215. In some multiple-input multiple-output (MIMO) embodiments that transmit more than one data stream with multiple antennas, the parameters for receiving the multiple data streams may also be specified in downlink map 215.

Although scheduler 200 is described with respect to generating frequency and time plan 211 for downlink bursts of a downlink subframe, the scope of the invention is not limited in this respect. In other embodiments, scheduler 200 may generate an uplink frequency and time plan for uplink bursts of an uplink subframe transmitted from subscriber stations 120 (FIG. 1) to base station 106 (FIG. 1).

Although scheduler 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of scheduler 200 may refer to one or more processes operating on one or more processing elements. In some embodiments, scheduler 200, burst allocation unit 212, and downlink map composer 214 may comprise one or more processes operating on one or more processing elements.

FIGS. 3A and 3B illustrate examples of OFDMA downlink (subframes in accordance with some embodiments of the present invention. Downlink subframe 300 (FIG. 3A) and downlink subframe 350 (FIG. 3B) are illustrated in terms of frequency 332 and time 334. Downlink subframes 300 and 350 may be transmitted by a BWA network base station, such as base station 106 (FIG. 1), to one or more subscriber stations, such as subscriber stations 120 (FIG. 1). Downlink subframes 300 and 350 may correspond to downlink subframe 116 (FIG. 1). Downlink subframes 300 and 350 may include downlink preamble 302 followed by downlink map 304 and uplink map 306. Downlink (subframe 300 may also include a plurality of downlink bursts 310, which may be transmitted over one or more subchannels 312 as shown. Each subchannel 312 may include a predetermined number of subcarriers of a multicarrier communication channel. Each of channels 110 (FIG. 1) between base station 106 (FIG. 1) and subscriber stations 120 (FIG. 1) generally include all of subchannels 312.

In downlink subframes 300 and 350, downlink preamble 302 may be transmitted using portions of all subchannels 312. In downlink subframe 300, downlink map 304 and uplink (map 306 may share the same time slots but may be transmitted on different subchannels 312. In downlink subframe 350, portion 354 of downlink map 304 may be transmitted on all subcarriers of a time slot, while remaining portion 355 of downlink map 304 may share a next time slot with portion 356 of uplink map 306. Remaining portion 357 of uplink map 306 may be transmitted in a next time slot, which may be shared with some of downlink bursts 310. Downlink subframes 300 and 350 are intended to provide example structures of downlink subframe configurations and the scope of the invention is not limited to any one or more of these examples. Other downlink subframe configurations are also suitable.

Downlink preamble 302 may be a preamble symbol for use in time and frequency synchronization by subscriber stations 120 (FIG. 1). In some embodiments, downlink preamble 302 may be used for generating channel estimates for channels 110 (FIG. 1). Uplink map 306 may indicate the time slots and subchannels that subscriber stations 120 (FIG. 1) may use for uplink transmissions to base station 106 (FIG. 1).

Downlink map 304 may correspond to downlink map 215 (FIG. 2) generated by downlink map composer 214 (FIG. 2). Downlink map 304 indicates the structure of data portion 308 for each subscriber station 120 (FIG. 1) allowing each subscriber station 120 (FIG. 1) to receive downlink data from an allocated one of bursts 310. For example, referring to FIG. 3A, when data is transmitted to seven of subscriber stations 120 (FIG. 1), a first subscriber station (i.e., SS #1) may receive downlink data during burst 321, a second subscriber station (i.e., SS #2) may receive downlink data during burst 322, a third subscriber station (i.e., SS #3) may receive downlink data during burst 323, a fourth subscriber station (i.e., SS #4) may receive downlink data during burst 324, a fifth subscriber station (i.e., SS #5) may receive downlink (data during burst 325, a sixth subscriber station (i.e., SS #6) may receive downlink data during burst 326, and a seventh subscriber station (i.e., SS #7) may receive downlink (data during burst 327. Each burst 310 may utilize one or more of subchannels 312 during one or more time slots of downlink subframe 300. Although the example of downlink subframes 300 and 350 includes bursts 310 to seven subscriber stations, in accordance with some embodiments, downlink subframes 300 and 350 may include downlink bursts 310 to as few as one subscriber station to as many as ten or more subscriber stations, and in some embodiments, to as many as several hundred subscriber stations.

Figure 4:
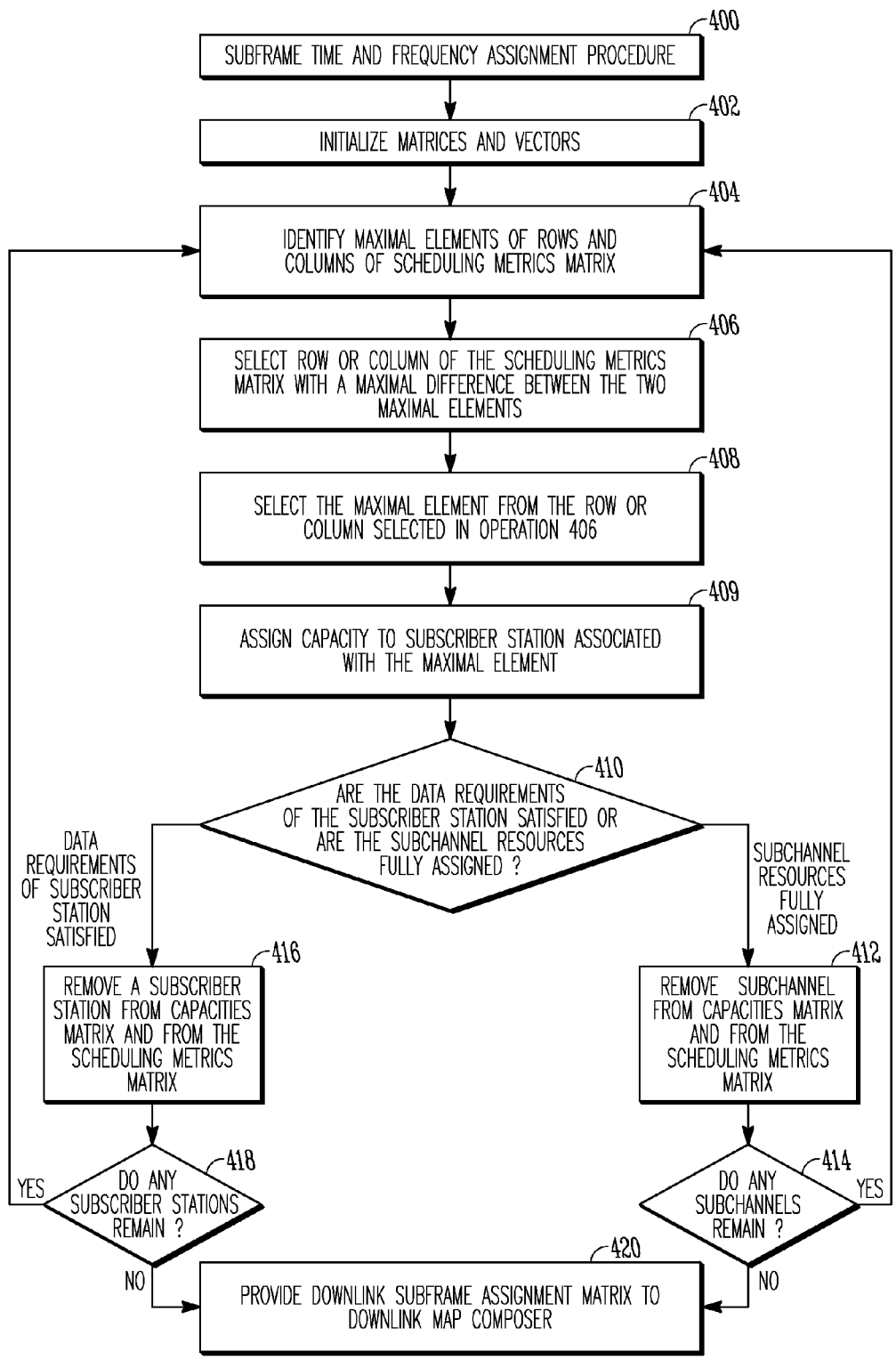
FIG. 4 is a flow chart of a subframe time and frequency assignment procedure in accordance with some embodiments of the present invention.

FIG. 4 is a flow chart of a subframe time and frequency assignment procedure in accordance with some embodiments of the present invention. Subframe time and frequency assignment procedure 400 may be performed by a scheduler, such as scheduler 200 (FIG. 2) to generate a frequency and time plan for composing a downlink map and for generating a downlink subframe, such as downlink subframe 300 (FIG. 3A) or downlink subframe 350 (FIG. 3B).

In some embodiments, procedure 400 may be performed to improve an objective function, such as overall system throughput. In some of these embodiments, procedure 400 may be performed to help maximize and/or optimize an objective function, such as overall system throughput. In this embodiment, the objective function for the network or system may be the sum of throughputs of the subscriber stations served by a frame, although the scope of the invention is not limited in this respect. The scheduling metrics may be the time-slot capacities discussed above. In some other embodiments, procedure 400 may use different objective functions, such as the product of the throughputs of the subscriber stations (i.e., the sum of the logarithm of the throughputs), and different scheduling metrics, such as the ratio of time-slot capacity over an averaged historical throughput (i.e., a proportional fairness criterion), although the scope of the invention is not limited in this respect as other criteria for optimizing an objective function may also be used.

Operation 402 initializes the matrices and vectors used by procedure 400. In some embodiments, operation 402 initializes a subchannel capacities matrix C, a scheduling metrics matrix S, a downlink subframe assignment matrix X, a subscriber station data requirements vector B, and a subchannel resource vector A. In some embodiments, the time-slot capacities of different subchannels may be provided by channel quality analysis unit 202 (FIG. 2) and may be organized to form the subchannel capacities matrix C. The subchannel capacities matrix C may be an M×N matrix in which M is the number of available subchannels 312 (FIG. 3) and N is the number of subscriber stations 120 (FIG. 1). The number of subchannels 312 (FIG. 3) included in the subchannel capacities matrix C may range from as few as ten or less to as great as several hundred or more.

Scheduling metrics matrix S may also be an M×N matrix and may be initialized based on the elements of the subchannel capacities matrix C. In some embodiments, scheduling metrics matrix S may be equal to the subchannel capacities matrix C, while in other embodiments, scheduling metrics matrix S may be calculated from the subchannel capacities matrix C, depending on the objective function being used.

In some embodiments, the scheduling metrics matrix S and the subchannel capacities matrix C may each have a column for each subscriber station and a row for each subchannel. However, the terms "row" and "column" are not meant to be limited and may be interchanged. For example, the operations described herein are equally applicable when the scheduling metrics matrix S, the subchannel capacities matrix C and the downlink subframe assignment matrix X are transposed.

In some embodiments, when a proportional fairness criterion is to be applied, the scheduling metrics matrix S may be calculated based on the throughput already assigned to each subscriber station in a time window of a predetermined length $T_j$. In these embodiments, each element of the scheduling metrics matrix S may be calculated from a corresponding element of the subchannel capacities matrix C using the following equation: $S_{ij}=C_{ij}/T_j$. The subscript i may correspond to the number of subscriber stations, and the subscript j may correspond to the number of subchannels.

In some embodiments, when the overall system throughput is to be improved and possibly maximized and predetermined priorities are to be assigned to the subscriber stations, the scheduling metrics matrix S may be calculated based on a weighting vector $W_j$. In these embodiments, the priorities of the subscriber stations may be expressed by weighting vector $W_j$ in which the $i^{th}$ component of the weighting vector $W_j$ is related to the priority of the corresponding subscriber may receive. In these embodiments, the weighting vector $W_j$ may be constant in time or it may be adjustable. In some of these embodiments, each element of the scheduling metrics matrix S may be calculated from a corresponding element of the subchannel capacities matrix C using the following equation: $S_{ij}=C_{ij}*W_j$.

In some embodiments, when the overall system throughput is to be improved and possibly maximized and a level of fairness is to be provided to the subscriber stations, the scheduling metrics matrix S may be calculated based on a compromise coefficient K. In these embodiments, each element of the scheduling metrics matrix S may be calculated from a corresponding element of the subchannel capacities matrix C using the following equation: $S_{ij}=C_{ij}*(1+K/T_j)$. In these embodiments, compromise coefficient K may be selected to determine the level of fairness in the system.

In some other embodiments, the scheduling metrics matrix S may be calculated independent of the subchannel capacities matrix C, although the scope of the invention is not limited in this respect.

Subscriber station requirements vector B may be a 1×N vector, and subchannel resource vector A may be a 1×M vector. In these embodiments, subscriber station data requirements vector B may include the requests from upper layers 206 (FIG. 2) for data transmissions for particular subscriber stations and may be expressed in a number of time slots or bits, although other units may also be suitable. Subchannel resource vector A may include the subchannel resources that may be allocated for data transmission to particular subscriber stations and may be expressed in a number of time slots or bits, although other units may also be suitable.

The downlink (subframe assignment matrix X may also be an M×N matrix that may, upon the completion of procedure 400, include the assignments of subchannel time slots for transmission of downlink bursts 310 (FIG. 2) to the subscriber stations. The elements of downlink subframe assignment matrix X may be expressed in either time slots or bits, although other units may also be suitable. In some embodiments, the actual allocation of subchannel time slots for transmission to subscriber stations 120 (FIG. 1) may be obtained by multiplying the elements of downlink subframe assignment matrix X by corresponding elements of the subchannel capacities matrix C. A subchannel time slot refers to a time slot of one of subchannels 312.

During operation 402, scheduling unit 210 (FIG. 2) may initialize downlink subframe assignment matrix X with zeros, the elements of subscriber station data requirements vector B may be set to values provided by upper network layers 206 (FIG. 2), and the elements of subchannel resource vector A may be set to the maximum values of available time slots for each subchannel 312 (FIG. 3). Operation 402 may also include initializing subchannel indices vector I and subscriber station indices vector J with indices from 1 to M and from 1 to N respectively.

Operation 404 comprises identifying the maximal elements of the rows and the columns of the scheduling metrics matrix S. In operation 404, two maximal elements may be found for each row and each column of the scheduling metrics matrix S. Operation 404 may also calculate the differences between the two maximal elements to determine a maximum difference, $d_{max}$, for each row and for each column of the scheduling metrics matrix S.

Operation 406 selects the row or column of the scheduling metrics matrix S having the maximal difference between the two maximal elements that may have been identified in operation 404. If more than one maximal difference is identified, the row or column associated with the maximal difference and having a maximal element may be selected. Upon the completion of operation 406, either one row or one column of the scheduling metrics matrix S may be selected.

Operation 408 selects the maximal element from the row or column selected in operation 406. For example, when a row of the scheduling metrics matrix S was selected in operation 406, operation 408 selects the maximal element of that row. When a column of the scheduling metrics matrix S was selected in operation 406, operation 408 selects the maximal element of that column. The element of the scheduling metrics matrix S selected in operation 408 corresponds to a particular subscriber station (k) and a particular subchannel (l) of the subchannel capacities matrix C.

Operation 409 assigns capacity to the subscriber station associated with the maximal element selected in operation 408. In some embodiments, operation 409 assigns elements of the downlink subframe assignment matrix X to the subscriber station associated with the row or column of the subchannel capacities matrix C corresponding to the maximal element of the scheduling metrics matrix S selected in operation 408. In some embodiments, the indexes of the maximal element may be stored in variables l and k and a delivery value may be determined for the $k^{th}$ subscriber station in the $l^{th}$ subchannel as a minimum of the subchannel capacity resources available and subscriber station data requirements 207 (FIG. 2). The subchannel capacity resources may be calculated as the product of the number of available time slots in the $l^{th}$ subchannel and the capacity of the $l^{th}$ subchannel for $k^{th}$ subscriber station. The delivery value may be assigned to the element of the downlink subframe assignment matrix X with coordinates $\{I(l), J(k)\}$. After the delivery value is calculated, both the subchannel's resources and the subscriber station's data requirements may be decreased by the delivery value. After the performance of operation 409, either the data requirements of $k^{th}$ subscriber station are satisfied or the resources of the $l^{th}$ subchannel are fully assigned.

Operation 410 determines whether the data requirements of the $k^{th}$ subscriber station have been satisfied or whether the subchannel resources of the $l^{th}$ subchannel have been fully assigned. When operation 410 determines that the data requirements of the $k^{th}$ subscriber station have been satisfied, operations 416 and 418 may be performed. When operation 410 determines that the subchannel resources of the $l^{th}$ subchannel have been fully assigned, operations 412 and 414 may be performed.

Operation 412 may remove the subchannel (i.e., the row corresponding to subchannel l) from both the subchannel capacities matrix C and the scheduling metrics matrix S because the resources of that subchannel have been fully assigned in operation 409. Operation 412 may also remove the corresponding subchannel index l from subchannel indices vector I.

Operation 414 determines whether any subchannels have remaining capacity by determining whether any elements remain in subchannel indices vector I.

Operation 416 may remove the subscriber station (i.e., the column corresponding to subscriber station k) from the subchannel capacities matrix C and the scheduling metrics matrix S because the data requirements of that subscriber station have been satisfied in operation 409. Operation 416 may also remove the corresponding subscriber station index k from subscriber station indices vector J.

Operation 418 determines whether any subscriber stations remain by determining whether subscriber station indices vector J is empty.

When operation 414 determines that subchannels have remaining capacity, or when operation 418 determines that subscriber stations remain, operation 404 through 418 may be repeated until either the subchannel capacities of a downlink subframe have been fully assigned or the data requirements of the subscriber stations have been met. When operation 414 determines that subchannels do not have remaining capacity, or when operation 418 determines that no subscriber stations remain, operation 420 may be performed.

Operations 414 and 418 may be viewed as determining whether the subchannel capacities matrix C is empty. Operations 404 through 418 are repeated until the subchannel capacities matrix C becomes empty indicating that either the subchannel capacities of a downlink subframe have been fully assigned or that the data requirements of the subscriber stations have been met. When the subchannel capacities matrix C is empty, downlink subframe assignment matrix X may be complete.

Operation 420 provides the completed downlink subframe assignment matrix X to downlink map composer 214 (FIG. 2). Operation 420 may also provide the completed downlink subframe assignment matrix X to burst allocation unit 212 (FIG. 2) to allocate the downlink (burst in accordance with the completed downlink subframe assignment matrix X. In these embodiments, the completed downlink subframe assignment matrix X may correspond to frequency and time plan 211 (FIG. 2).

Although the individual operations of procedure 400 are illustrated and described as separate operations, one or more of the individual operations may be performed concurrently, and nothing requires that the operations be performed in the order illustrated.

Upon the completion of procedure 400, a downlink map is generated based on the downlink subframe assignment matrix and downlink bursts may be allocated to the subscriber stations based on the downlink subframe assignment matrix. A downlink subframe, such as downlink subframe 300 (FIG. 3), may be generated to include downlink map 304 (FIG. 3) and downlink bursts 310 (FIG. 3). Downlink subframe 300 (FIG. 3) may then be transmitted by base station 106 (FIG. 1) to subscriber stations 120 (FIG. 1).

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A method of scheduling a downlink subframe for transmission comprising:

assigning frequency and time dimensions of downlink bursts to each of a plurality of subscriber stations based on one or more individual channel characteristics and one or more individual data requirements associated with the subscriber stations, wherein channel capacities for each of a plurality of subchannels between the subscriber stations and a base station are generated from the channel characteristics including from one or more of channel estimates generated by the base station, channel feedback or performance feedback being generated by one or more of the subscriber stations, generating a subchannel capacities matrix that includes a subchannel capacity for each subchannel with each of the subscriber stations based on the channel characteristics for each subscriber station; and generating a scheduling metrics matrix comprising scheduling metrics, the scheduling metrics matrix having a column for each subscriber station and a row for each subchannel, and wherein the assigning comprises:

selecting either a row or a column of the scheduling metrics matrix having a maximal difference between the two maximal elements of either a row or a column;

selecting a maximal element of the selected row or column, the maximal element corresponding to one of the subscriber stations and one of the subchannels; and assigning capacity of the corresponding subchannel to the corresponding subscriber station.

2. A channel-aware scheduler comprising:

a channel quality analysis unit to generate one or more channel quality metrics based on one or more individual channel characteristics associated with a plurality of subscriber stations;

a scheduling unit to assign frequency and time dimensions of downlink bursts to each of the subscriber stations based on the channel quality metrics and one or more individual data requirements of the subscriber stations; and an objective functions and constraints unit to generate channel capacities for each of a plurality of subchannels between the subscriber stations and a base station from the channel characteristics, the channel capacities being generated from one or more of channel estimates by the base station, channel feedback or performance feedback being generated by one or more of the subscriber stations, wherein the objective functions and constraints unit generates a subchannel capacities matrix that includes a subchannel capacity for each subchannel with each of the subscriber stations based on the channel characteristics for each subscriber station, wherein the objective functions and constraints unit further generates a scheduling metrics matrix of scheduling metrics, the scheduling metrics matrix having a column for each subscriber station and a row for each subchannel, and wherein the scheduling unit selects either a row or a column of the scheduling metrics matrix having a maximal difference between the two maximal elements of either a row or a column, selects maximal element of the selected row or column, the maximal element corresponding to one of the subscriber stations and one of the subchannels, and assigns capacity of the corresponding subchannel to the corresponding subscriber station.

* * * * *